July 2, 1968

G. A. TORRANCE 3,390,642

SPROCKET CONSTRUCTION FOR CONVEYOR CHAINS

Filed Aug. 15, 1966

INVENTOR
GORDON A. TORRANCE

BY
Farley, Forster & Farley

ATTORNEYS

July 2, 1968          G. A. TORRANCE          3,390,642
SPROCKET CONSTRUCTION FOR CONVEYOR CHAINS
Filed Aug. 15, 1966          2 Sheets-Sheet 2
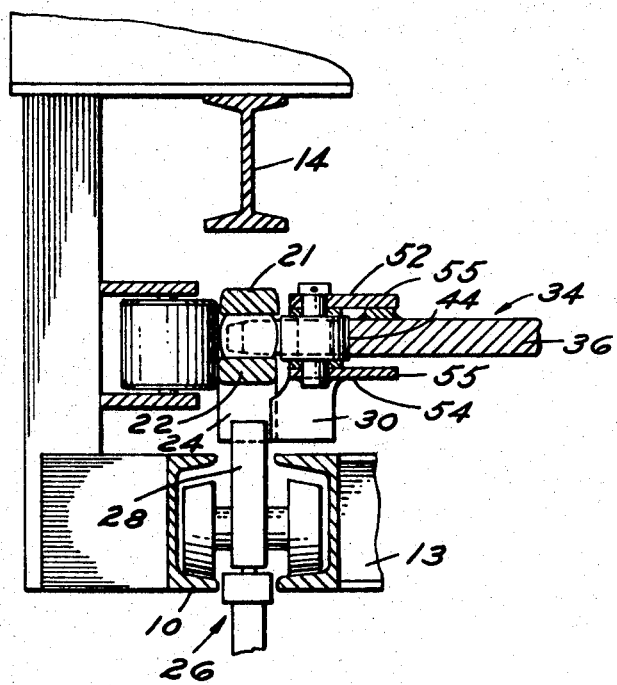
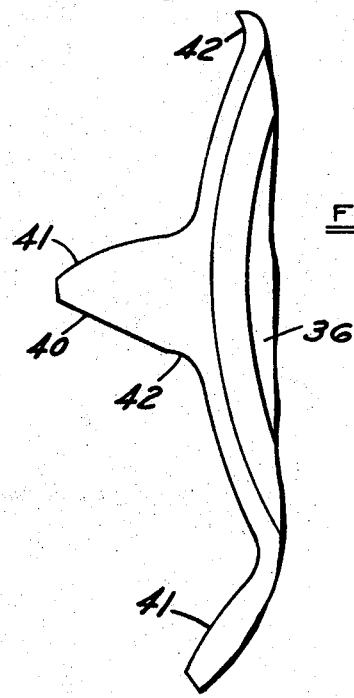
INVENTOR
GORDON A. TORRANCE
BY
Farley, Forster & Farley
ATTORNEYS

United States Patent Office 3,390,642
Patented July 2, 1968

1

3,390,642
SPROCKET CONSTRUCTION FOR
CONVEYOR CHAINS
Gordon A. Torrance, Taylor, Mich., assignor to Jervis
B. Webb Company, a corporation of Michigan
Filed Aug. 15, 1966, Ser. No. 572,539
11 Claims. (Cl. 104—172)

This invention relates to an improved construction for a sprocket particularly adapted for use with chains of conveyors, enabling a single sprocket to perform the dual function of receiving drive from a driven chain and imparting synchronized movement to a second chain.

Many conveyors incorporate main and branch lines with main and branch line chains which must by synchronously driven. For example, in conveyors of the power and free type, where a load carrier supported on one track is propelled by pushers carried by a chain supported on an adjacent track, it is frequently desirable to transfer the carrier between a pusher of a chain travelling on a main line and a pusher of a branch line chain driven in synchronism with the main line chain so that a positive, controlled transfer can be obtained from one pusher to the other. One of the chains, usually the main line chain, is driven by a conventional drive unit; and, synchronized drive has usually been imparted to the other chain either by employing a power take-off device which engages the driven chain and imparts drive to a device such as a sprocket which in turn engages and drives the other chain, or alternately, by equipping the other chain with a series of dogs which project laterally and engage the driven chain so that drive is directly imparted from one chain to the other.

The object of the present invention is to provide a single sprocket which will perform the dual function of engaging and receiving drive from a driven chain while simultaneously engaging and imparting drive to a second chain. A further object is to provide a construction in which this single sprocket may also serve to guide and support one of the chains in proper relationship to the other in the region of the junction between the main and branch lines.

The sprocket construction of the invention has dual purpose teeth adapted to engage and project through one of the chains and simultaneously engage the other of the chains. These sprocket teeth are each provided on one side thereof with a radially outward surface developed for engagement by one of the chains and on the other side thereof with a radially inward surface developed for engagement by the other of the chains, the chains each engaging a portion of the periphery of the sprocket in side-by-side relation to each other, with one chain lying inwardly of the other with respect to the axis of rotation of the sprocket.

Other features and advantages of the construction will appear from the following description of the representative embodiment of the invention shown in the accompanying drawings in which:

FIGURE 2 is an enlarged sectional elevation taken as indicated by the line 2—2 of FIG. 1; and FIGURE 3 is an enlarged fragmentary plan view illustrating the sprocket tooth form.

Figure 1:
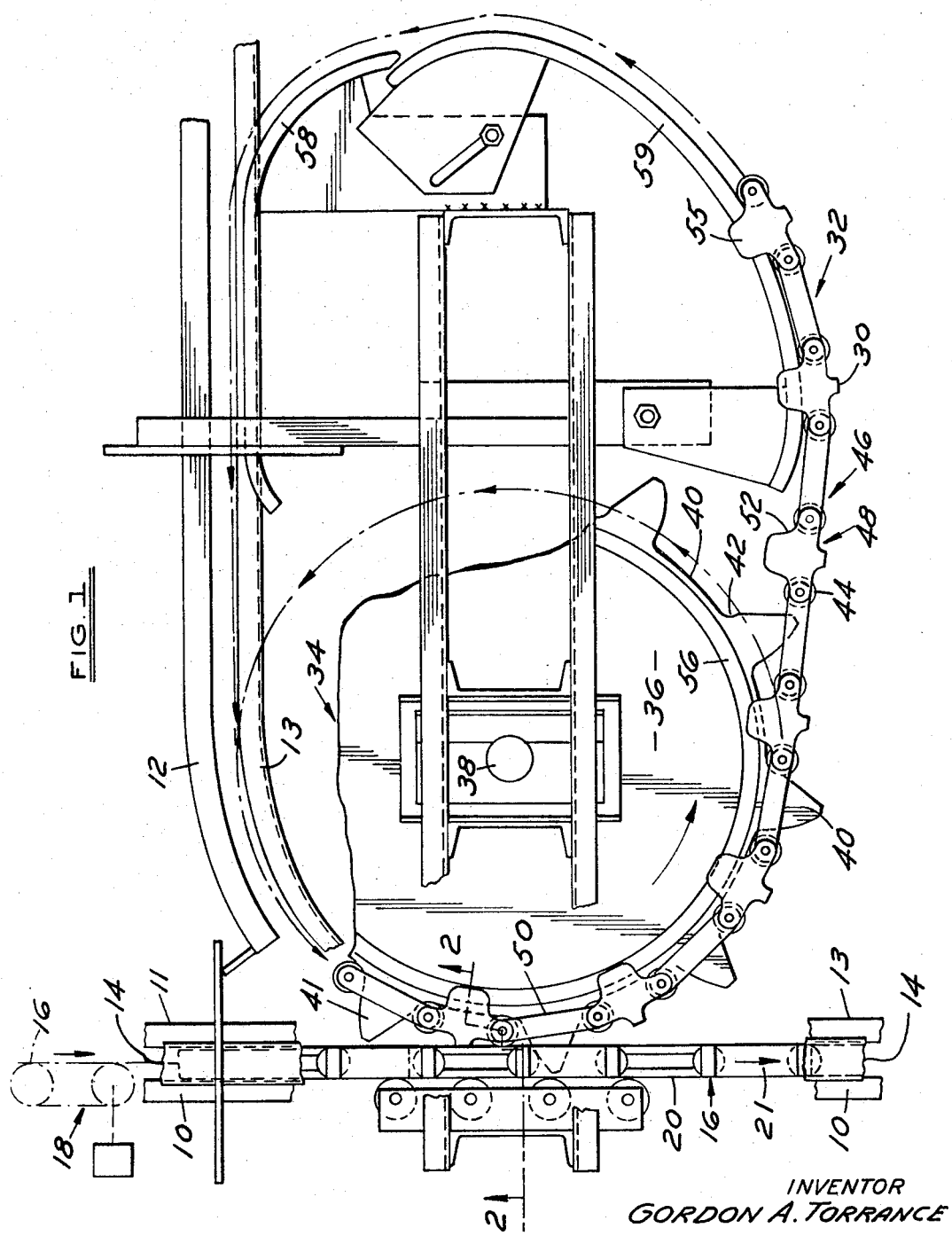
FIGURE 1 is a plan view of a junction between main and branch lines of a power and free conveyor, illustrating a preferred form of the invention for imparting drive from the main line chain to the branch line chain.

The conveyor construction illustrated in FIGS. 1 and 2 includes a main line carrier supporting track composed of a pair of channel members 10 and 11 and a branch line carrier supporting track composed of similar channel members 12 and 13, the branch line track merging with the main line track at a junction where a switch tongue (not shown) is installed in the conventional manner. An I-beam track member 14 is mounted above the main carrier track members 10 and 11 and supports trolleys (not shown) which in trun support a main line conveyor chain 16 which is driven by a drive unit 18. The main chain is conventional in form, being composed of alternate center links 20 and alternate pairs of upper and lower side bars 21 and 22, certain of the lower side bars including a depending pusher 24. A trolley 26 of a load carrier is propelled along the carrier supporting track by engagement between a pusher 24 on the chain and an upstanding driving dog 28 on the carrier.

The junction between main branch lines shown in FIG. 1 is arranged to feed a carrier into the main line from the branch line through the engagement of the carrier driving dog 28 by a pusher 30 on a transfer chain 32 which is synchronously driven from the main chain through a single sprocket 34, constructed in accordance with the invention. The sprocket 34 has a body portion 36 rotatably mounted on a central axis 38 and provided with a series of radially projecting teeth 40. As best shown in FIG. 3, each tooth 40 is formed on one side thereof with a chain engaging portion 41, located toward the outer end of the tooth and developed with reference to the pitch and shape of the end of a center link 20 of the main chain which the portion 41 is to engage. Each tooth 40 is also formed with a second chain engaging portion 42, located radially inwardly of the portion 41 and on the opposite side of the tooth; the portion 42 being developed with reference to the pitch and shape of a roller element 44 mounted between adjacent links of the transfer chain 32. Hence each tooth has one chain engaging portion 41 at one radius from the sprocket axis 38 and facing in one direction of sprocket rotation, and a second chain engaging portion 42 formed at a different radius from the sprocket axis and facing in the opposite direction of sprocket rotation. Each tooth is adapted to engage and project through a link of the transfer chain 32 and simultaneously engage a link of the main chain 16.

A roller type of transfer chain is illustrated and is composed of alternate longer links 46 and shorter links 48, the effective pitch of the chain being determined by the length of one short link and one long link. This effective pitch of the transfer chain is different than the effective pitch of the main chain by an amount proportional to the difference in the radius of the chain engaging portions 41 and 42 of each sprocket tooth 40 from the axis 38 of sprocket rotation.

Each of the links 46 and 48 of the transfer chain is composed of a pair of side bars. The side bars 50 which form one of the longer links 46 are adapted to straddle a sprocket tooth as best shown in FIG. 2. These longer side bars 50 enable the root or base portion of the tooth to be made bigger, thereby strengthening the tooth as a whole.

The shorter alternate links 48 of the transfer chain consist of upper and lower side bars 52 and 54 formed with inwardly extending portions 55, and the lower side bar 54 being provided with the depending pusher 30. The inwardly projecting portions 55 of the links 48 are adapted to straddle the sprocket, the portion 55 of the upper side bar 52 engaging a spacer strip 56 secured to the upper surface of the sprocket adjacent the periphery thereof. The inwardly projecting portions 55 also straddle guide bars 58 and 59 which define the path of travel of the transfer chain.

The sprocket 34 not only receives drive from the main chain 16 and imparts synchronized drive to the branch chain 32 but also serves to support and guide the branch chain along that critical portion of its path of travel when the two chains come into side-by-side relation at the junction between the main and branch lines. This results in a positive positioning of the two chains and enables any desired relation between the pushers 24 and 30 thereof to be established and maintained.

While a preferred arrangement for a main chain and branch transfer chain has been shown and described it will be appreciated by those skilled in the art that the principles of the invention are applicable also to other chain combinations and arrangements, including branch chains other than the transfer type and pusher chains for floor truck tow lines. It will also be understood that numerous modifications to the specific construction might be made without departing from the scope of the invention as defined in the following claims.

I claim:

1. A sprocket construction adapted to receive drive from a driven chain and impart synchronized drive to a second chain, said sprocket having dual purpose teeth adapted to engage and project through one of said chains and simultaneously engage the other of said chains.

2. A sprocket construction as claimed in claim 1 wherein the sprocket teeth are each provided on one side thereof with a radially outward arcuate surface developed for engagement by one of said chains, and on the other side thereof with a radially inward arcuate surface developed for engagement by the other of said chains, the chains each engaging a portion of the periphery of the sprocket in side-by-side relation to each other with one chain lying inwardly of the other with respect to the axis of rotation of the sprocket.

3. A sprocket construction as claimed in claim 2 wherein the inner one of the chains is constructed with pivoted links which alternately straddle a sprocket tooth and extend between an adjacent pair of sprocket teeth.

4. A sprocket construction as claimed in claim 3 wherein the alternate links of the inner chain which extend between an adjacent pair of sprocket teeth have a shorter pitch line than the links which straddle a sprocket tooth.

5. A sprocket construction as claimed in claim 3 wherein the alternate links of the inner chain which extend between an adjacent pair of sprocket teeth are provided with inwardly extending projections adapted to straddle the sprocket.

6. A sprocket for transmitting drive from a main driven chain of a power and free conveyor to a branch chain thereof, the sprocket having a body portion rotatable on a central axis and a series of radially projecting teeth; characterized by each tooth being formed with one chain engaging portion at one radius from the sprocket axis and facing in one direction of sprocket rotation and with a second chain engaging portion formed at a different radius from the sprocket axis and facing in the opposite direction of sprocket rotation, a sprocket tooth projecting through one of said chains and simultaneously engaging the other thereof, one of the chains having a different effective pitch than the other and the difference in radius of said chain engaging portions of each sprocket tooth being proportional to the difference in pitch of the chains.

7. A sprocket construction as claimed in claim 6 wherein the inner one of the chains with reference to the axis of sprocket rotation is composed of alternate longer and shorter links with the effective chain pitch equal to the sum of the length of one shorter and one longer link, a sprocket tooth projecting through one of the longer links.

8. A sprocket construction as claimed in claim 6 wherein the outer one of the chains with reference to the axis of sprocket rotation is the main chain and the inner one of the chains with reference to the axis of sprocket rotation is the branch chain, the sprocket receiving drive from the main chain and transmitting drive to the branch chain.

9. A sprocket construction as claimed in claim 8 wherein the branch is composed of links, each link including a pair of spaced side bars, the side bars of alternate links being adapted to straddle a sprocket tooth, and the side bars of links intermediate the alternate links being provided with inwardly extending portions adapted to straddle the sprocket whereby that portion of the chain which engages the sprocket is supported and guided thereby.

10. A sprocket construction as claimed in claim 9 wherein at least certain of the links intermediate the alternate links are each provided with a pusher.

11. A sprocket construction as claimed in claim 6 wherein the inner one of the chains with reference to the axis of sprocket rotation is composed of links each of which includes a pair of spaced side bars, the side bars of alternate links being adapted to straddle a sprocket tooth, at least the upper one of the side bars of links intermediate the alternate links being provided with a supporting portion projecting toward the sprocket axis, and a spacer strip on the upper surface of the sprocket adjacent the periphery thereof adapted to be overlapped and engaged by said supporting portion.

References Cited

UNITED STATES PATENTS

| | | | |
|---|---|---|---|
| 576,719 | 2/1897 | Bonnell | 74—243 X |
| 2,949,862 | 8/1960 | Klamp | 104—170 X |

ARTHUR L. LA POINT, *Primary Examiner.*

D. F. WORTH, *Assistant Examiner.*